United States Patent
Nomula et al.

(10) Patent No.: US 7,783,660 B2
(45) Date of Patent: Aug. 24, 2010

(54) SYSTEM AND METHOD FOR ENHANCED TEXT MATCHING

(75) Inventors: Jagadeshwar R. Nomula, Los Angeles, CA (US); Christa Stelzmuller, Long Beach, CA (US)

(73) Assignee: Yahoo! Inc., Sunnyvale, CA (US)

( * ) Notice: Subject to any disclaimer, the term of this patent is extended or adjusted under 35 U.S.C. 154(b) by 992 days.

(21) Appl. No.: 11/539,040

(22) Filed: Oct. 5, 2006

(65) Prior Publication Data

US 2008/0086488 A1    Apr. 10, 2008

(51) Int. Cl.
*G06F 17/30* (2006.01)

(52) U.S. Cl. ............... 707/769; 707/713; 707/715; 707/741; 707/999.003; 707/999.101; 707/E17.014; 707/E17.069; 707/E17.083; 707/E17.101

(58) Field of Classification Search ............ None
See application file for complete search history.

(56) References Cited

U.S. PATENT DOCUMENTS

2007/0162422 A1* 7/2007 Djabarov ............... 707/2
2008/0010316 A1* 1/2008 Liao et al. ............. 707/104.1
2008/0051072 A1* 2/2008 Kraft et al. ............. 455/418
2008/0071780 A1* 3/2008 Ichiriu et al. ............. 707/6

* cited by examiner

*Primary Examiner*—Don Wong
*Assistant Examiner*—Andalib F Lodhi
(74) *Attorney, Agent, or Firm*—James J. DeCarlo; Greenberg Traurig, LLP (57) ABSTRACT

The disclosure describes search systems and methods in which exact token searches, spelling suggestions, and split-token searches are used in conjunction to return search results to the user. Depending on the number and relevancy of results for the search query results from each of the steps the results are either merged or discarded into the final result set. The split-token search is adapted to generate two split-tokens from the token(s) of the search query in anticipation that the search token(s) is misspelled. As the location of the misspelling is unknown, the split-token search widens the scope of the results provided in response to the search. In an embodiment, the split-token search includes performing a prefix search for tokens matching a prefix split-token and a postfix search for tokens matching a postfix split-token. In an embodiment, the index is specially adapted to allow the postfix search to be performed more efficiently.

22 Claims, 4 Drawing Sheets

SYSTEM AND METHOD FOR ENHANCED TEXT MATCHING

BACKGROUND

Search engines using a keyword approach are limited in their capability to look for misspellings in a search query. They look for search queries which are "close" in terms of number of letters to be edited to get to a search item with a higher frequency of search query occurrence for misspellings. This approach achieves excellent performance, but at the cost of missing some obvious misspellings or requiring user interaction to resolve.

Some other search engines use a N-gram based approach in which all fixed-length sequences of letters (grams) in the searchable items are indexed into a gram index. For example, in a "trigram" system the text of every search term is split into three letter tokens that are indexed separately, e.g., the term "madonna" when indexed results in the separate trigrams "mad", "ado", "don", "onn", and "nna" being stored in the gram index. The gram index is searched by splitting the search query to grams of the same length and searching for each of the grams in the gram index. While this approach is effective in catching misspellings, it comes at a significant performance cost, intensive storage requirements and often returns far too many possible results.

SUMMARY

The present invention includes search systems and methods in which exact token searches, spelling suggestions, and split-token searches are used in conjunction to return search results to the user. Depending on the number and relevancy of results for the search query results from each of the steps the results are either merged or discarded into the final result set. The split-token search is adapted to generate two split-tokens from the token(s) of the search query in anticipation that the search token(s) is misspelled. As the location of the misspelling is unknown, the split-token search widens the scope of the results provided in response to the search. In an embodiment, the split-token search includes performing a prefix search for tokens matching a prefix split-token and a postfix search for tokens matching a postfix split-token. In an embodiment, the index is specially adapted to allow the postfix search to be performed more efficiently.

The efficacy of this solution betters that of leading search engines on the web. It also achieves the same performance metrics that typical web search engines achieve.

In one aspect, the disclosure describes a text searching method that includes receiving a search query containing a token, in which the token has a token number of characters in a token sequence. The method further includes generating, from the token, a first split-token and a second split-token. The first split-token includes a first number of characters in a first sequence and the second split-token includes a second number of characters in a second sequence, wherein the first number and second number are determined based on the token number of characters. The method further includes searching an index for first entries, in which the first entries are entries having an entry number of characters equal to or greater than the first number and having initial characters that exactly match the first sequence of the first split-token. The method also includes searching an index for second entries, in which the second entries are entries having an entry number of characters equal to or greater than the second number and having initial characters that exactly match the second sequence of the second split-token.

In another aspect, the disclosure describes an indexing method that includes searching pages of text for tokens, each token being a plurality of characters in an associated token sequence. For each new token encountered in the searching operation, the method includes creating a first entry in an index, the first entry corresponding to a copy of the plurality of characters in the associated token sequence. For each new token, the method also includes creating a second entry in the index, the second entry corresponding to the plurality of characters of the new token in a second sequence different from the token sequence associated with the new token.

In yet another aspect, the disclosure describes a system for searching an index for entries matching a token in which each token is a string of characters in an original sequence starting with an initial character and ending with a last character. The system includes the index, wherein the index includes at least one first entry and at least one associated second entry corresponding to each token. Each first entry identifies the corresponding token and each associated second entry identifies a reversed token, the reversed token being the string characters of the corresponding token in reverse sequence.

The system further includes a search split-token generator adapted to receive search tokens and create a prefix split-token and a postfix split-token corresponding to each search token. The prefix split-token is a string of characters starting with the initial character and, depending on the embodiment, having some number of characters of the corresponding search token in the search token's original sequence. The postfix split-token being a string of some other number of characters of the corresponding search token in reverse sequence and starting with the last character of the search token. The system further includes an index search module adapted to search for any first or second entries corresponding to tokens that contain characters in a sequence that exactly match the prefix split-token or the postfix split-token.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

The disclosure describes systems and methods for use by a search engine that perform very well at providing useful results even when a search query contains a misspelling.

Figure 1:
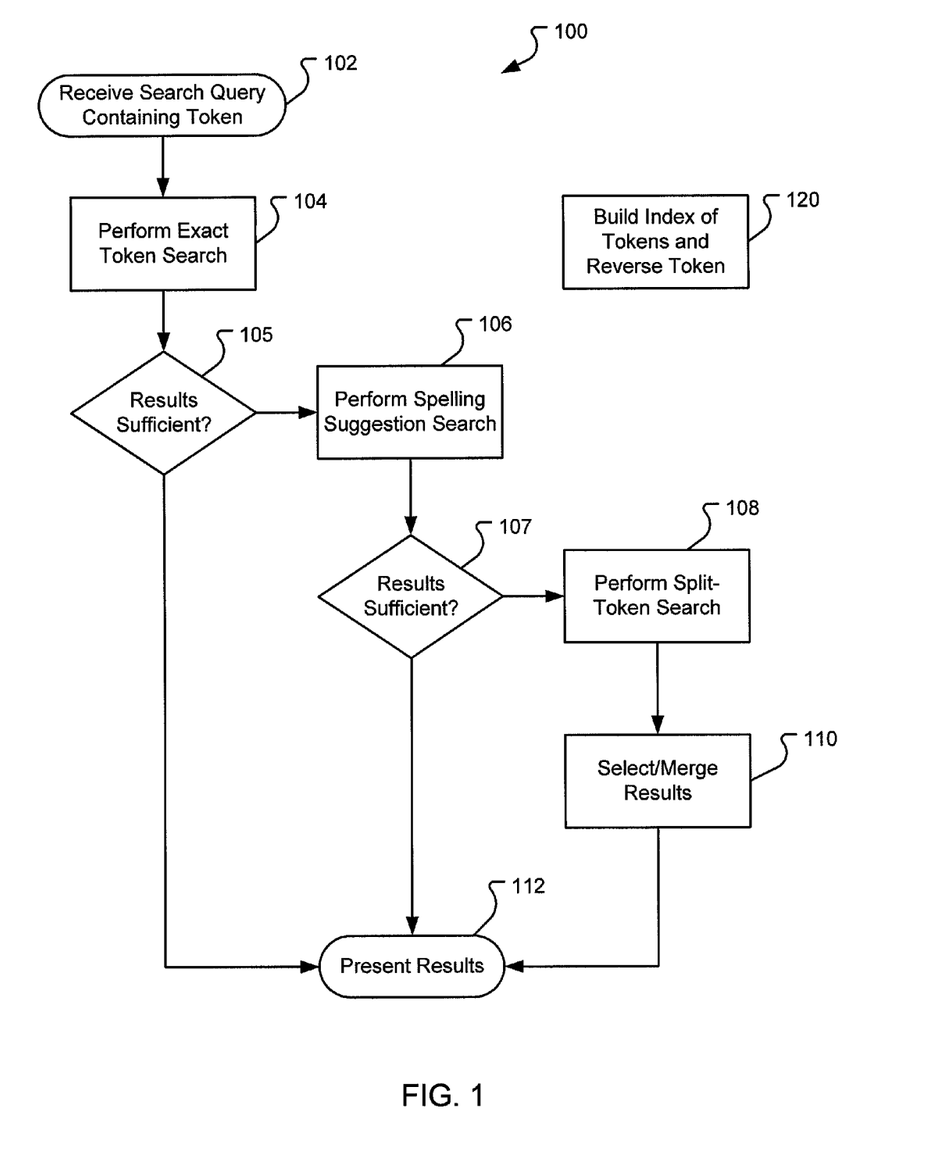
FIG. 1 illustrates an embodiment of a method of indexing and searching for tokens. In an embodiment, the system creates or is provided with an index of tokens.

FIG. 1 illustrates an embodiment of a method 100 of indexing and searching for tokens. In an embodiment, the system creates or is provided with an index of "tokens". A token is a string of characters in a particular sequence, such as for example keywords, that are independently identifiable. In an embodiment, for example, a block of text may be considered a token if it is set off from other text by one or more <space> characters.

In the embodiment shown, the system creates in a build index operation 120 an index. Systems for indexing tokens are known in the art. The index may be a database that includes at least one entry for each distinct token. The database may also associate the token with one or more other pieces of information. For example, a web page search engine may create an index that includes entries for each word encountered in web pages inspected by the system building the index (typically a web crawler). The index may also associate each token with the page or pages in which the token was found. The index, in fact, may associate each token with any type of data related to the token. In an embodiment, one entry may be created for each distinct token and that entry may link to or be associated with every web page on which the token appears. In an alternative embodiment, there may be multiple entries for one or more tokens in the index. One skilled in the will recognize that there are other ways of building an index of tokens that may not necessary require data structures like entries. Any such method may be utilized in the systems and methods described herein. However, as the concept is easily understood by the reader, this disclosure will discuss the index as containing an entry for each indexed token even though the reader will understand that any indexing method may be used including those that index without creating identifiable entries.

The method 100 described may be used with any index, regardless of the application or the nature of the underlying data. For example, the index may be an index of keywords found on web pages, names found in files in a file structure, songs in a music database, or DNA data related to a genome. As most readers are familiar with keyword search engines for web pages, the balance of the disclosure will use as an example an index of keywords found on web pages that can be used to search for web pages based on the keywords contained in the text of the web pages. However, the reader will understand the systems and methods are more broadly application to any type of data the may be indexed and searchable by any kind of associated token.

The index created in the build index operation 120 indexes two types of tokens: original tokens and reverse tokens. Original tokens includes tokens in the form (i.e., the original characters and sequence) as they are found by the system, e.g., as they appear in the text of a web page. For example, if the word "chamillion" is contained in the text of a web page, a web page index may contain the token "chamillion". Reverse tokens are tokens which are the original tokens reversed (i.e., spelled backwards). Thus, the reverse token of "chamillion" is "noillimahc". As another example, if the word "Madonna" appears on a web page, the index will include an entry for the original token "Madonna" and a corresponding entry for the reverse token "annodam." In an embodiment, both of the entries are then equally associated with the web page containing the original token. Furthermore, depending on the implementation the case of the letters may or may not be differentiated in the index.

In an alternative embodiment, only a portion, such as the first portion, of each original token and reverse token may be indexed. However, in an embodiment that uses the same index for exact token lookups as described below, such indexing of portions of the tokens results in a larger index size than indexing the complete original token and complete reverse token.

Thus, in the embodiment shown, for each token indexed by the system, both the original token and the reverse token are indexed. While this results in an increased index size, it is drastically less than gram-type indexes that create many different entries for each token.

In the embodiment shown, the build index operation 120 is illustrated as being independent of the rest of the flow of the method 100. This allows the index to be built and maintained over time independently of the searching system's querying of the index. The index may further be built and maintained by a system that is completely independent of the query system. In an alternative embodiment, the index may be built or refreshed at the time of receiving a query or in response to any other trigger or condition.

In any case, given the index of original tokens and reverse tokens, the method 100 includes a receiving a request to search the index in a receive request operation 102. In the embodiment shown, the request includes receiving a search query containing at least one search token to search the index for. In the web page example, a search query may be "Madonna concert schedule" which contains the search tokens "Madonna," "concert," and "schedule." As often happens, a user generating the search query may misspell one or more of the tokens in a search. Such a misspelling, for example, may be "Medonna" when the user is actually looking for the musician Madonna.

Figure 2:
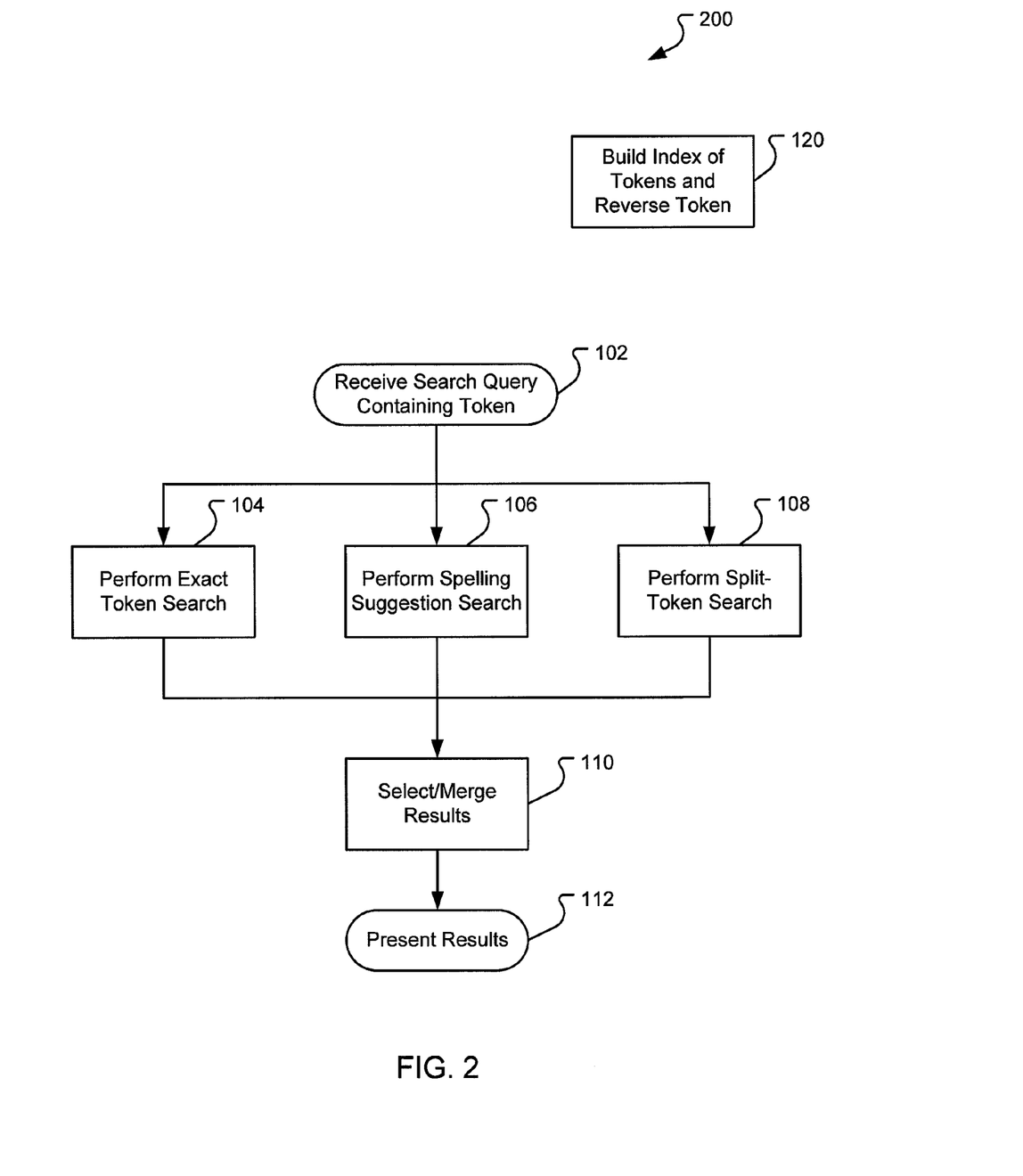
FIG. 2 illustrates an embodiment of an alternative method of indexing and searching for tokens.

After receiving the search request and search token(s), the method 100 performs a set of search operation 104, 106 and 108 in an attempt to identify likely indexed tokens that match the query. In the embodiment shown, the operations 104, 106 and 108 are performed in series. FIG. 2 illustrates one alternative embodiments with the same operations 104, 106 and 108 in being performed in parallel. Other embodiments are also possible.

In FIG. 1 the first search operation 104 performed is an exact token search 104. The exact token search 104 includes searching the index for original tokens that exactly match the search token. In an embodiment, both original tokens and reverse tokens are searched by the operation 104 and the results include any exact match to either token type. In an alternative embodiment, the index includes information that allows the two types of tokens in the index to be differentiated and only original tokens are searched. Alternatively, all tokens in the index may be searched by results may be screened so that only results of matches with original tokens are returned as search results. In any case, the exact search operation 104 generates a set of results. In the web page search example, such results may include a list of web pages associated with the tokens searched ranked based on some mechanism. The set of results may include a large number of results or, as may happen if there is a misspelled token in the search query, the set of results may be very small or, indeed, have no results.

These results are then inspected in a determination operation 105 that determines if the quantity and/or quality of the results meet some predetermined criteria. In an embodiment, such criteria may include the size/number of results in the set of results. For example, if the number of results in the set of results is below some predetermined threshold, the determination operation 105 may determine that results are insufficient. Other criteria are also possible, such as for example a minimum relevancy for results in the set. If the results meet the criteria, then the results are returned and presented to the source of the request in a return results operation 112. If the results do not meet one or more criteria, a second search operation is performed.

In the embodiment shown, the second search performed is a spelling suggestion search operation 108. Spelling suggestion searches provide a suggested spelling correction for a given term. Spelling suggestion is a feature of many computer software applications used to suggest plausible replacements for words that are likely to have been misspelled. Any spelling suggestion system or method, either now known or later invented, may be used. Algorithms for spelling suggestion may incorporate several information resources to determine candidates for misspelled words and the words' likely correct replacements, including Frequency of a word's occurrence in reliable data sources, search query logs, list of frequently misspelled words, and domain specific data resources (e.g., corpora of medical terms).

In an embodiment, the results of a spelling suggestion search operation 106 are one or more suggested spelling corrections, each associated with a set of search results. After the spelling suggestion search operation 106 is performed, the results of the operation 106 are then inspected in a second determination operation 107 that determines if the quantity and/or quality of the results meet some predetermined criteria. Such a determination may be made in the same manner as that in the initial determination operation 105 or using different criteria or a completely different algorithm. If the results meet the criteria, then the results are returned and presented to the source of the request in a return results operation 112. In an alternative embodiment, the results of the exact token search 104 and the suggested spelling operation 106 may be combined in a combine results operation (such as that described below).

In the embodiment shown, if the results do not meet one or more criteria, a third search operation is performed. The third search performed is a split-token search operation 108. A detailed embodiment of a split-token search operation 108 is described in greater detail below. In general terms, the split-token search operation 108 includes creating two partial tokens, referred to as split-tokens, from the search token. The number of split-tokens created may be predetermined, or may be selected based on the number of characters in the search token, the number of syllables in the search token or the number of sounds in a phonetic representation of the search token. In an embodiment, the length of the split-tokens are dependent on the length of the search token from which they are derived.

One benefit of creating split-tokens is that if there is a misspelling in the search token, there is a probability that the misspelling will occur in only one of the split-tokens. By searching the index for tokens that match the split-tokens, at least some of the results returned will be results associated with the token the that search query was attempting to search for, but for the misspelling.

In an embodiment, for example, the split-token search operation 108 creates two split-tokens, each split-token containing at least half the number of characters in the search token, e.g., for the search token "Madona," the split-tokens "mado" and "dona" are created. In an embodiment, the number of characters selected for a split-token may include selecting a minimum number of characters, such as 4 characters in the "Madona" described herein, in addition to selecting the number of characters based on the search token length.

In this example, the split-token "mado" is considered a prefix token and the split-token "dona" is considered the postfix of the search token. The index is then searched for entries that exactly matching the split-tokens in their respective positions. That is, the entries are searched for tokens containing the first four characters "mado" and tokens containing the last for characters "dona". Thus, in the embodiment, results for the prefix token search may include results associated with "Madonna" (which is the desired results but which may not have been found by the earlier search operations 104, 106) as well as results associated with the Trek Madone bicycle and possibly other tokens starting with or even consisting solely of "mado" such as MADO the Mississippi Association of Dispensing Opticians.

The postfix search, i.e., the search for tokens which contain "dona" as the last characters in the token, will return another set of results, for example results associated with people have the family "Gredona." The results of the individual searched for each split-token are then combined to generated a set of results for the split-token search operation 108. As will be discussed in greater detail below, most databases are not efficient in searching for postfixes. To make the split-token search more efficient, an embodiment of the search system includes storing the reverse tokens in the index and then searching on the reverse of the second split-token. Thus, in the present example, the second split-token is "dona" and the search system searches for the postfix split-token "anod." This will return any reverse tokens starting with "anod," which is the same results set as would be found when the index for original tokens ending in "dona." However, the results of the postfix search are returned with significantly more efficiency than would otherwise be the case. For the purposes of this disclosure, the term postfix split-token refers to a partial token generated from a given search token that contains the second half or more of the characters of the given search token in reverse order, beginning with the last character of the search token. Thus, for example, "erianoilli" and "erianoi" are both postfix tokens of the token "chamillionaire" and "annod" and "anno" are both postfix tokens of the tokens "Madonna" and "Medonna".

In an embodiment, the results of the split-token search operation 108 may be directly returned to the source of the search query in the return results operation 112. In the embodiment shown, however, the results of the split-token search operation 108 are combined with the results (if any) from the other search operations 104, 106 in a combine results operation 110. The combine results operation 110 may include ranking the results or otherwise determining how and where the results from each of the search operations 104, 106, 108 should be ordered and presented to the source of the search query.

The return operation 112 then formats and returns the results to the source of the search query. In an embodiment, if the search query is received from a client computer through a web page interface of the search system, the return operation 112 may include generating and formatting a results web page and transmitting the web page to the client. If the search query is received from a programmatic system, on the other hand, then the results may be transmitted as raw data or some form of formatted data as required by the source of the search query. The source is then responsible for analyzing the data as necessary to perform its functions.

The above was discussed with reference to a single search token. One skilled in the art will recognize that the method 100 can be easily adapted to search queries containing multiple tokens. Each token may be searched separately by the method 100 and the results combined in a known manner.

FIG. 2 illustrates an embodiment of an alternative method 200 of indexing and searching for tokens. In the embodiment shown, operations similar to those described above are performed, but in a manner so that the various search operations 104, 106, 108 are performed in parallel to reduce the overall time required for the search results to be generated. The two determination operations are omitted, their functions being performed as part of the merge results operation 110 so that only the appropriate results from one or more of the search operations 104, 106, 108 are presented in the return results operation 112.

Figure 3:
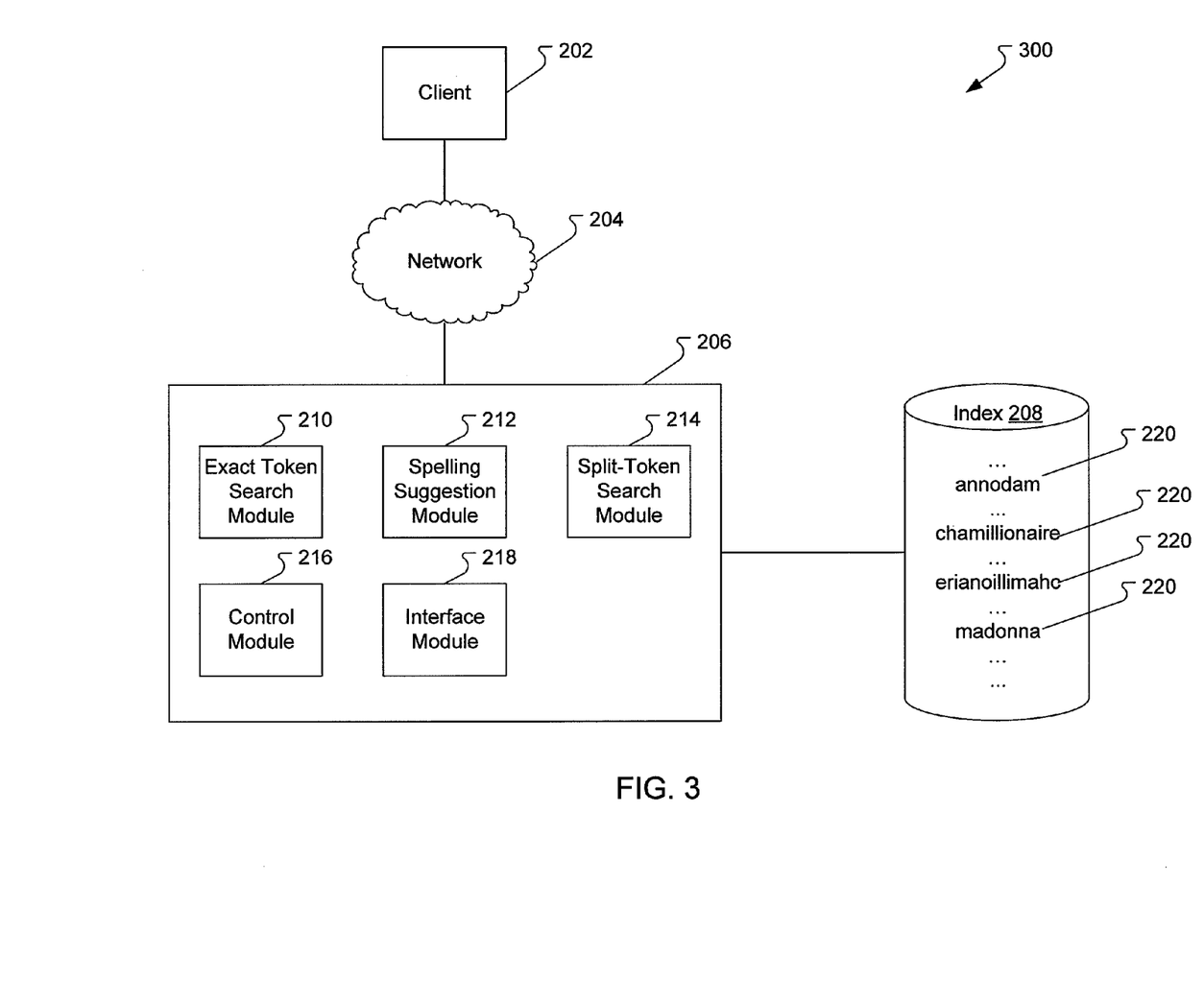
FIG. 3 illustrates an embodiment of a computing architecture that includes a system for index searching adapted to perform embodiments of the methods described in FIGS. 1 and 2.

FIG. 3 illustrates an embodiment of a computing architecture 300 that includes a system for index searching adapted to perform embodiments of the methods described in FIGS. 1 and 2. The architecture 300 includes a client 202 or other search query source connected via a network 204 to a search system 206 adapted to search an index 208.

In the embodiment shown, the various elements of the architecture could be separate computing devices that include a processor and memory for storing data and software as well as means for communicating with other computing devices, e.g., a network interface module. In an embodiment, computing devices may be provided with operating systems and are adapted to execute software applications in order to manipulate data. Examples of computing devices include personal computers, smart phones, personal data assistants, servers and mainframes. One skilled in the art will recognize that although referred to in the singular, a computing device may actually consist of a plurality of computing devices that operate together to provide data in response to requests from other computing devices.

In a computing device, local files, such as media files or raw data stored in a datastore, may be stored on a mass storage device (not shown) that is connected to or part of any of the computing device. A mass storage device and its associated computer-readable media, provide non-volatile storage for the computing device. Although the description of computer-readable media contained herein refers to a mass storage device, such as a hard disk or CD-ROM drive, it should be appreciated by those skilled in the art that computer-readable media can be any available media that can be accessed by the computing device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In an embodiment, the client 202 in the architecture may be a client computing device, such as a personal computer, smart phone, laptop computer, etc., connected to the system 206 via a network 204 like the Internet, a LAN, a WAN or a private computing network. Alternatively, the client 202 could be a software module that is requesting the system 206 to perform a search. In that alternative embodiment, the client 202 and the system 206 could be separate software processes executed by shared hardware resources. The client 202 could be an automated part of an independent system that needs searches performed or could be simple interface allows users to transmit search queries to the search system 206.

The index 208 may be a music index that indexes tokens corresponding to song information such as title, artist, album, etc., a web page index with tokens corresponding to the words in the text or metadata of the web page, or a product index with tokens corresponding to product specifications. Other examples are also possible and considered within the scope of this system. Indeed, the system may be adapted to work with any searchable index or database.

In the embodiment shown, the index 208 indexes some number of original tokens and, for each original token, its corresponding reverse token. In the embodiment shown, the index is a music index that includes tokens for the music artists Chamillionaire and Madonna. Thus, the index 208 includes entries corresponding to the original tokens "chamillionaire" and "madonna" and the reverse tokens "erianoillimahc" and "annodam." In an embodiment, each token 220 in the index 208 may be associated with one or more content items such as songs, data elements, or other information.

The search system 206 may likewise be a single computing device, a group of computing devices adapted to work together in a coordinated fashion, or a software module depending on the embodiment. The search system 206 includes one or more modules for performing the search methods described herein. In the embodiment shown, the search system 206 includes an exact token search module 210, a spelling suggestion module 212, a split-token search module 214, a control module 216 and a user interface module 218. One skilled in the art will recognize that more or fewer modules may be utilized depending on the functionality of the system desired. The modules may be independent software applications, segments of executable code, hardware components or combination of the same depending on the implementation.

The exact token search module 210 is adapted to perform an exact token search of the index 208. In an embodiment, the exact token search module 210 performs a structured search of the index to identify any entries in the database containing or identifying tokens that exactly match the characters of a given search token. The module 210 is then further adapted to return results to the control module 216 for screening, further processing and transmittal to the search query source.

The spelling suggestion module 212 is adapted to provide a suggested spelling correction for a given term. Spelling suggestion is a feature of many computer software applications used to suggest plausible replacements for words that are likely to have been misspelled. Any spelling suggestion system or method, either now known or later invented, may be used. Algorithms for spelling suggestion may incorporate several information resources to determine candidates for misspelled words and the words' likely correct replacements, including frequency of a word's occurrence in the index 208, search query logs, list of frequently misspelled words, and domain specific data resources (e.g., corpora of medical terms).

The split-token search module 214 is adapted to perform a split-token search of the index 208. The split-token search module 214 generates the necessary split-tokens from the search token(s), and is adapted to perform the index search for tokens that match the split-tokens. In an embodiment, such a search is not necessarily an exact token search as a search on the split-token "mado" should return entries associated with "Madonna" as well as "madone." Thus, one way of conceptualizing the split-token search is search on the split-token followed by a "wildcard" character, e.g., searching on "mado*" where "*" is a wildcard indicating any set of none, one or more characters.

In an embodiment, the index 208 contains both the original tokens indexed and each original token's corresponding reverse token as described above. Therefore, in order to perform a postfix search of a split-token that is a postfix token, all that need be done is a prefix search of reverse tokens for the characters of the postfix token. As many indexes and database systems are very efficient in performing prefix searches, but not necessary as efficient in performing postfix searches, the combination of indexing reverse tokens and prefix searching the index for the postfix token results in a very efficient search operation.

The split-token module 214 may then be considered to perform two or more split-token searches and return the combined results to the control module 216.

A control module 216 is provided to screen the results as has been described elsewhere and return a results set that meets any criteria set by the administrator. The control module may be adapted to perform the search operations in series, based on the results obtained from each consecutive search, or may perform the search operations in parallel and generate a final results set based on an analysis of the separate results of each of the search operations.

In the embodiment, the control module 216 is further adapted to transfer the final results to the interface module 218 for transmittal to the client 202. In an embodiment, the control module 216 may perform the formatting of the results. In an alternative embodiment, the interface module 218 may be adapted to perform the formatting as necessary to provide the particular client 202 with useable data.

Figure 4:
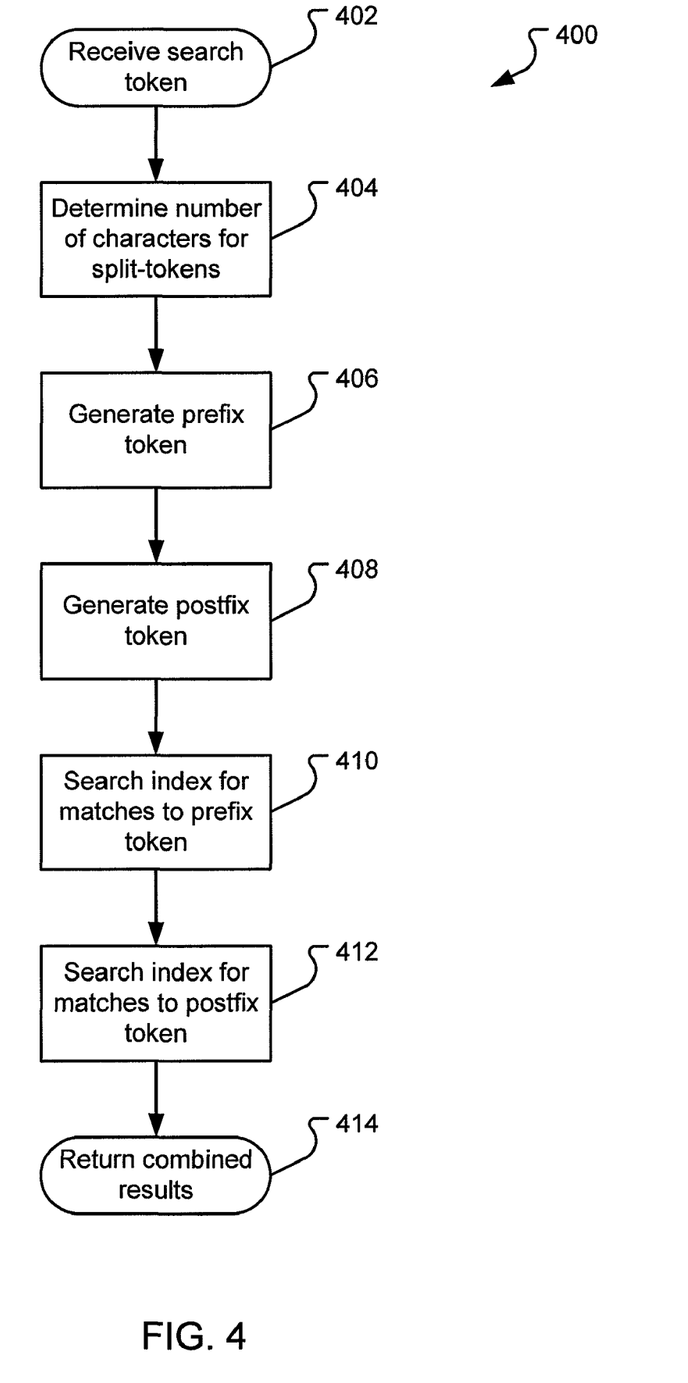
FIG. 4 is an embodiment of a method for performing a split-token search of an index.

FIG. 4 is an embodiment of a method for performing a split-token search of an index. In the embodiment shown, the method 400 starts with receiving a search token in a receiving operation 402 in which the token may be misspelled and not exactly match tokens associated with the results desired for the search. As the location of the misspelling is unknown, a split-token search is performed to widen the scope of the results provided in response to the search.

A length determination operation 404 is then performed. In the operation 404, the search token is inspected and the number of characters in the search token is determined. Based on the number of characters in the search token, the number of characters is selected for each of the split-tokens. In an embodiment of a split-token search, the number used is half of the number of characters in the search token. If the number of characters in the search token is an odd number, the number used for the split-token it is rounded up. In an alternative embodiment, the number is rounded down.

Many other permutations are possible when selecting the number of characters to be used in the split-tokens. For example, in yet another embodiment if the search token is less than a threshold number of characters, some other number for the character length of the split-tokens is selected. In yet another embodiment, if the search token is less than a threshold number of characters, the split-token search may include or may be limited to a search of a common misspellings database. In yet another embodiment, if the search token is greater than some predetermined threshold, a maximum number of characters for the split-token may be selected.

The number of characters in the split-tokens may be the same, or may be different. For example, in an embodiment, if the number of characters in the search token is an odd number, the number of characters selected for the prefix token may be half the number of characters in the search token rounded up, and the number of characters selected for the postfix token may be half the number of characters in the search token rounded down. Other embodiments are also possible.

After the number of characters has been selected for each split-token, a generate prefix token operation 406 is performed. In the operation 406, the system takes the previously selected number of characters for the prefix token, $n_{prefix}$, from the front of the search token in the order in which they appear as the prefix token. Thus, as described above, the search token "Medonna" may result in the prefix token "medo."

The postfix token is generated by the system in a postfix generation operation 408. After the number of characters, $n_{postfix}$, for the postfix token has been determined, the last n characters in the search token are taken and their order reversed to obtain the postfix token. Thus, if the $n_{postfix}$ is 4, the search token "medonna" results in a postfix token of "anno."

In the embodiment shown, after the two different tokens have been created, two searches 410, 412 of the index are performed. The reader will understand that both searches can be considered a "prefix search" in that the searches identify entries in index that begin with the same characters as the search token. Thus, in the embodiment a postfix search is achieved by performing a prefix search on the postfix token which will return matching reversed tokens in the index.

In the first search operation 410, a prefix search is performed for matches to the prefix token that identifies any entries, records or tokens in the index in which the first $n_{prefix}$ characters exactly match the prefix token. A prefix token search set of results is then determined from the matches found.

In the second search 412, a prefix search for matches to the postfix token is performed to identify any entries, records or tokens in the index in which the first $n_{postfix}$ characters exactly match the postfix token. A postfix token search set of results is then determined from the matches found.

In an alternative embodiment in which an efficient postfix search algorithm is available, the generate postfix token operation 408 may exclude the reversal of the characters—the postfix token then not being a reversed token. In this alternative embodiment, the second search operation 412 is then performed using the postfix search algorithm.

After the results have been generated, a return operation 414 collects and transmits the results. In an embodiment, the return operation 414 may simply collect and return all results generated. This could be considered a logical "OR" operation in which the results presented are matches to the prefix token or the postfix token.

In an alternative embodiment, the return operation 414 may screen the results. In an embodiment, the return operation 414 may screen the results by returning only results that were generated by both the prefix search 410 and the postfix 412 search (i.e., an AND operation). Such an embodiment may catch misspelling in which a character is omitted from a search token.

In an embodiment additional screening may be performed based on additional information, such as popularity, relevancy, etc. of the various results from the method 400. For example, the return operation 414 could return only results that were generated by both the prefix search 410 and the postfix 412 but if those results are less than some threshold, the system could return all results generated by both searches 410, 412.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A method comprising:
   receiving, by at least one computing device, a search query containing a token, the token having a token number of characters in a token sequence;
   generating, by the at least one computing device, a first split-token from the token and a second split-token from the token, the first split-token having a first number of characters of the token in a first sequence and the second split token having a second number of characters of the token in a second sequence, wherein the first number and second number are determined based on the token number of characters;
   searching, by the at least one computing device, an index for first entries using the first split-token; and
   searching, by the at least one computing device, the index for second entries using the second-split token; and
   combining, by the at least one computing device, the first and second entries as search results for the received search query.

2. The method of claim 1 wherein generating further comprises:
   generating, by the at least one computing device, the first split-token so that the first sequence is the same as the token sequence; and
   generating, by the at least one computing device, the second split-token so that the second sequence is a reverse order of the token sequence.

3. The method of claim 2 wherein generating further comprises:
   generating, by at least one computing device, the first split-token so that the first split-token contains the initial first number of characters in the token in the token sequence; and
   generating, by the at least one computing device, the second split-token so that the second split-token contains the last second number of characters in the token in the reverse order of the token sequence.

4. The method of claim 1, the searching the index for first entries using the first split-token further comprising:
   searching, by the at least one computing device, the index for the first entries, the first entries being entries having an entry number of characters equal to or greater than the first number and having initial characters that exactly match the first sequence of the first split-token.

5. The method of claim 1, the searching the index for second entries using the second split-token further comprising:
   searching, by the at least one computing device, the index for the second entries, the second entries being entries having an entry number of characters equal to or greater than the second number and having initial characters that exactly match the second sequence of the second split-token.

6. The method of claim 1 further comprising:
   returning, by the at least one computing device, as the search results for the search query the first entries and the second entries.

7. The method of claim 6 further comprising:
   searching, by the at least one computing device, the index for third entries exactly matching the token.

8. The method of claim 7 further comprising:
   performing, by the at least one computing device, a spelling suggestion search of the index for fourth entries.

9. The method of claim 8 further comprising:
   wherein the combining comprises combining, by the at least one computing device, the third and fourth entries with the first and second entries as search results for the received search query; and
   returning, by the at least one computing device, the search results for the search query.

10. The method of claim 1 wherein the first number and the second number are the same.

11. A method comprising:
    searching, by at least one computing device, pages of text for tokens, each token being a plurality of characters in an associated token sequence;
    for each new token encountered in the searching operation, creating, by the at least one computing device, a first entry in an index, the first entry corresponding to a copy of the plurality of characters in the associated token sequence;
    for each new token, creating, by the at least one computing device, a second entry in the index, the second entry corresponding to the plurality of characters of the new token in a second sequence different from the token sequence associated with the new token;
    receiving, by the at least one computing device, a search query containing a search token;
    generating, by the at least one computing device and from the search token, a first search split-token and a second search split-token;
    searching, by the at least one computing device, the index for first entries using the first search split-token;
    searching, by the at least one computing device, the index for second entries using the second search split-token.

12. The method of claim 11 wherein the second sequence is the reverse of the token sequence so that the second entry corresponds to the new token spelled backwards.

13. The method of claim 11, generating the second search split-token further comprising:
    altering, by the at least one computing device, the token sequence of characters in the search token to generate the second search split-token.

14. The method of claim 13 wherein generating the first search split-token further comprises removing, by the at least one computing device, a number of characters from the search token to obtain the first search split-token; and wherein generating the second search split-token further comprises removing, by the at least one computing device, the number of characters from the altered search token to obtain the second search split-token.

15. The method of claim 14 further comprising:

determining, by the at least one computing device, the number of characters to remove based on the plurality of characters in the new token.

16. The method of claim 14 further comprising:

removing, by the at least one computing device, no more than half of the characters from the altered search token to obtain the second search split-token.

17. The method of claim 14 further comprising:

returning the at least one computing device, as search results at least some of the first entries corresponding to characters exactly matching the first search split-token and the second entries corresponding to characters exactly matching the second search split-token.

18. A system comprising:

at least one computing device having a processor and memory, the at least one computing device configured to provide:

an indexer to build an index, wherein the index includes at least one first entry and at least one associated second entry corresponding to each token, each first entry identifying the corresponding token that is a string of characters in an original sequence starting with an initial character and ending with a last character, and each associated second entry identifying a reversed token, the reversed token being the string of characters of the corresponding token in reverse sequence;

a search split-token generator that receives search tokens and creates first and second split-tokens corresponding to a search token received by the search split-token generator; and an index search module that searches the index for any first and second entries corresponding to the first and second split-tokens.

19. The system of claim 18:

wherein the search split-token generator is further configured to create the first split-token as a prefix split-token and the second split-token as a postfix split-token;

the prefix split-token being a string of characters starting with the initial character of the corresponding search token and having at least half of the characters of the corresponding search token in the search token's original sequence;

the postfix split-token being a string of at least half of the characters of the corresponding search token in reverse sequence and starting with the last character of the search token; and wherein the index search module is further configured to search for any first or second entries corresponding to tokens that contain characters in a sequence that exactly match the prefix split-token or the postfix split-token.

20. The system of claim 19, the at least one computing device further configured to provide:

a results generator configured to return as results any first or second entries corresponding to tokens that contain characters in a sequence that exactly match the prefix split-token or the postfix split-token.

21. The system of claim 18, the indexer being configured to receive tokens, each token being a sequence of characters associated with content items, and generate in the index the first entry and the associated second entry for the token.

22. The system of claim 18 further comprising:

wherein each first entry identifies its corresponding token with a content item associated with the token and each associated second entry identifies the same content item.

* * * * *